(12) United States Patent
Nakagawa

(10) Patent No.: US 6,307,761 B1
(45) Date of Patent: *Oct. 23, 2001

(54) SINGLE STAGE HIGH POWER-FACTOR CONVERTER

(75) Inventor: Shin Nakagawa, Tokyo (JP)

(73) Assignee: Fidelix Y.K. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,020
(22) PCT Filed: Mar. 23, 1999
(86) PCT No.: PCT/JP99/01455
  § 371 Date: Nov. 17, 1999
  § 102(e) Date: Nov. 17, 1999
(87) PCT Pub. No.: WO99/49560
  PCT Pub. Date: Sep. 30, 1999

(30) Foreign Application Priority Data

Mar. 23, 1998 (JP) .................................. 10-094073
Apr. 10, 1998 (JP) .................................. 10-115985
Dec. 28, 1998 (JP) .................................. 10-377333

(51) Int. Cl.[7] .................................. H02M 7/23
(52) U.S. Cl. .................................. 363/65; 363/70
(58) Field of Search .................................. 363/65, 67, 69, 363/70

(56) References Cited

U.S. PATENT DOCUMENTS

| | | | |
|---|---|---|---|
| 4,533,987 | * | 8/1985 | Tomofuji et al. .................. 363/36 |
| 4,841,429 | * | 6/1989 | McClanahan et al. ............. 363/126 |
| 5,319,536 | * | 6/1994 | Malik .................................. 363/65 |
| 5,576,940 | * | 11/1996 | Steigerwald et al. .............. 363/17 |
| 5,587,892 | * | 12/1996 | Barrett .............................. 363/44 |
| 5,731,969 | * | 3/1998 | Small ................................. 363/126 |

* cited by examiner

Primary Examiner—Adolf Deneke Berhane
(74) Attorney, Agent, or Firm—Norris, McLaughlin & Marcus P.A.

(57) ABSTRACT

An output of a first converter for switching a rectified line current and an output of a second converter for switching a direct current are added together so that an efficiency, a power factor, a holding time, and a ripple characteristic can be improved. Further, the power supply apparatus can be made compact and the cost for manufacturing the apparatus can be reduced. A flyback converter type output circuit and a forward converter type output circuit are used in a parallel manner so that a transformer having a high efficiency can be used, and it becomes easier to control the apparatus.

13 Claims, 13 Drawing Sheets

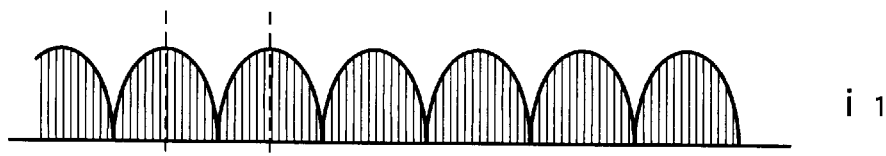
FIG.6(a)    $i_1$
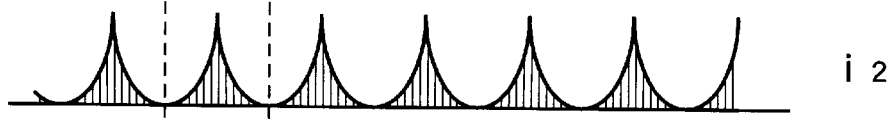
FIG.6(b)    $i_2$
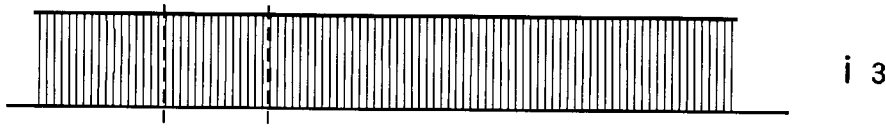
FIG.6(c)    $i_3$
FIG.6(d)
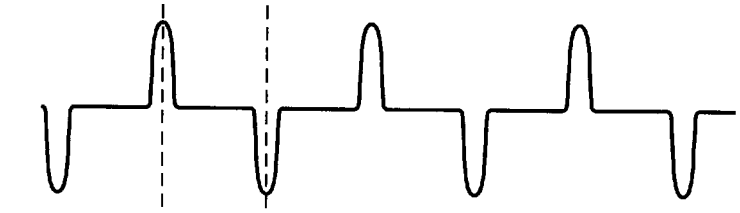
FIG.6(e)
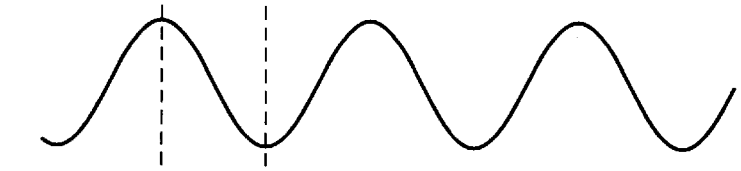
FIG.6(f)
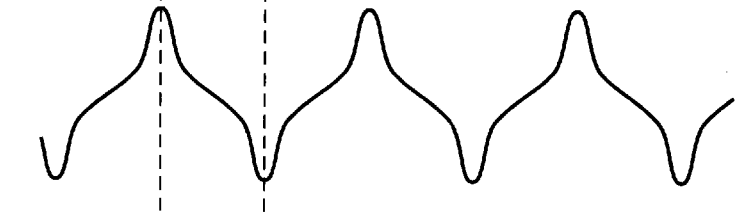

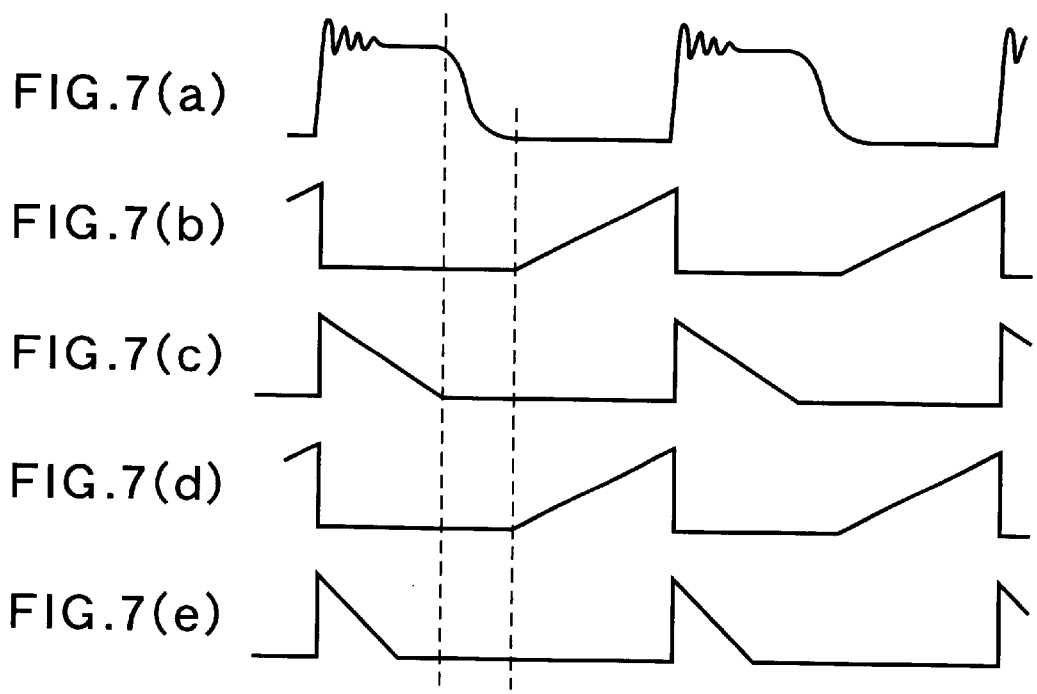

SINGLE STAGE HIGH POWER-FACTOR CONVERTER

FIELD OF THE INVENTION

The present invention relates to a technique for suppressing harmonics current in power supply apparatuses such as AC-DC converters and inverter-type power supplies for lighting equipment, i.e. a technique for improving the power factor thereof, without causing an aggravation of power transferring efficiency. According to the invention, the size of power supply apparatuses is made compact, the reliability is improved, and the cost for manufacture is reduced. Further, the present invention relates to a power supply apparatus where the holding time for a power failure can be kept longer and a ripple in an output voltage can be reduced as occasion demands.

Furthermore, the present invention relates to a power supply apparatus where both the character of a flyback type converter, which is easy to control, and the advantage of a forward type converter, i.e. a high efficiency, are provided.

BACKGROUND OF THE INVENTION

In order to reduce the amount of harmonics current in power supply apparatuses, in other words, in order to improve the power factor thereof, it is considered to use a so-called active harmonics filter or a so-called capacitance-less converter, which does not have a smoothing capacitor at an input side thereof. In such an active harmonics filter or a capacitance-less converter, a smoothing capacitor is not provided after the rectifying section, and a rectified line current is directly switched by a switching element, so that a necessary and sufficient power factor can be obtained and the construction thereof is very simple. However, they also have disadvantages such that a significant amount of output ripple occurs or a holding time is not apt to be sufficiently kept for an instant power failure of about 0.02 sec. Therefore, a so-called two-stage converter type power supply apparatus is used, in which a DC-DC converter is provided after the active harmonics filter. In such an apparatus, an electric current must go through two-stage converters, so that a switching loss is caused twice and then the efficiency becomes low.

On the other hand, some single switching element type converters are suggested in which a holding time can be kept and the output ripple can be reduced so as to overcome the disadvantage of the conventional capacitance-less converter type apparatus while a power factor there is also improved. However, almost all of these apparatuses are designed as an energy circulating type converter or a resonance type converter; therefore an electric current is circulated at the primary side of the apparatus. In addition to this, when an electric current goes through diodes or inductors a loss of electric current is caused so that efficiency becomes low.

Further, in case of applying a forward type circuit to a capacitance-less converter having a single switching element, it is not so easy to combine a forward type circuit with the capacitance-less converter. Because dealing with a reset current is difficult and a more complicated contrivance is required to realize the combination.

The object of the present invention is to provide a single-stage converter type power supply apparatus where the energy loss, caused by two-stage switching operations in a two-stage converter type power supply apparatus, is reduced to improve the efficiency of the apparatus.

Another object of the present invention is to provide a single stage converter type power supply apparatus where a power factor is improved without reducing the efficiency, and the holding time can be kept long and also the ripple characteristic can be improved.

As stated above, if it is tried to keep a sufficient holding time and to improve a ripple characteristic while improving a power factor in a single stage converter type power supply apparatus, one cannot avoid making to make the switching loss large. There are two types of circuit system for a single stage converter type switching power supply system, one of which is the flyback type circuit system and the other one is a forward type. The former has an advantage that is easy to control while having a disadvantage in that the efficiency is somewhat low and the size of the transformer must be large. On the other hand, the latter has an advantage in that the efficiency is high and the size of the transformer can be made smaller; however, it is required to give a reset current in order to prevent a saturation of the cores and therefore it is difficult to control the system because of the limitation for dealing with the reset current. For this reason, almost all of the capacitance-less converters use the flyback type circuit system.

In addition to this, capacitance-less converters have disadvantages in that a sufficient holding time cannot be obtained under a power failure condition because energy cannot be stored at the primary side of a transformer and a great amount of output ripple occurs.

The present invention has solved these problems by means explained below.

DISCLOSURE OF THE INVENTION

In a power supply apparatus according to the first invention of the present application, a switching transformer or a switching choke coil, which has no current smoothing function, i.e. which is for use in a rectified line current power supply, and a switching transformer or a switching choke coil, which has a current smoothing function, i.e. which is for use in a direct current power supply, are provided in a parallel manner; the transformer and the choke coil are arranged to be switched by only one switching element; the transformer output and the choke coil output are added. In accordance with such a construction, a power factor, a holding time and a ripple characteristic can be sufficiently obtained, while the efficiency is well improved. That is to say, since an electric current goes through both the rectified line current route and the direct current route in a parallel manner, only one switching loss is caused and thus the efficiency of the apparatus is increased. Naturally, after the electric current passes through these routes, how to add the outputs thereof can be freely selected, i.e. in a series manner or a parallel manner, so as to make it suitable for the circuit to which the power supply apparatus is applied.

The second invention of the present application is to provide a power supply apparatus where power is directly supplied to a load through a converter for switching a rectified line current route; and a DC-DC converter for switching a direct current route, which is provided in a different route from the rectified line current switching route but in a parallel manner. According to the second invention, the disadvantage of the output ripple or the holding time for power failure is compensated. In such a construction, electric current passes the rectified line current switching route and the direct current switching route in a parallel manner and the efficiency is increased because the switching loss is caused only once. The second invention is preferably used when a higher performance is required.

The third invention of the present application is a more simplified power supply apparatus in comparison to the second invention. That is to say, the direct current route is simplified where no switching circuit is used. The third invention is preferably used in a case that the output voltage becomes route 2 times, i.e. 1.41 times, or 2 route 2 times, i.e. 2.82 times as stated in the attached claims 3 to 5, and no line regulating circuit is required.

The fourth invention according to the present application has a construction such that a ripple component contained in a commercial power supply is added to a signal for controlling a switching operation adequately so that the ripple of an output voltage is reduced and the power factor is improved.

The fifth invention according to the present application is to provide a power supply apparatus where amounts of electric current between the rectified line current side and the direct current side are well balanced. More concretely, a suitable ratio of the amount of electric current between the rectified line current side and the direct current side is preliminarily determined with the aid of an allotter, or a suitable ratio is kept by following one of the outputs of these routes to the other.

In a pure flyback type converter, energy is stored in its cores when a switching element is on and the energy is discharged to the secondary side when the switching element is off. Therefore, a considerable size is required for the cores. Further, a certain gap should exist between the cores in order to prevent a magnetic saturation. The gap is the cause of an increase in the energy loss. While, a pure forward type converter needs only small size cores, because the energy is discharged to the secondary side when the switching element is switched on. In addition, no gap is necessary between the cores. However, in a forward type converter, it is required to discharge the reset current, and therefore, a duty cycle of the switching element cannot be made so great that it is difficult to control the apparatus in a flexible manner. The sixth invention according to the present application has a construction that an output circuit of a forward type converter is auxiliary provided in a flyback type converter, using the forward type converter in a parallel manner to the flyback type converter, so that the ease for controlling circuits in the flyback converter is kept while the high efficiency realized in the forward type converter can be obtained. According to such a construction, the apparatus functions such that energy is stored in the cores during when the switching element is on and at the same time energy is supplied to a load. Therefore, it is possible to make the size of cores smaller. Further, the gap between cores can be made narrow, the efficiency is improved. In case that a short holding time and a certain amount of ripple are allowed, the sixth invention can be suitably combined with a capacitance-less converter.

According to the seventh invention of the present application, the output of a flyback type converter and the output of a forward type converter are added together and the hybrid converter is combined with a partial resonance technique.

A BRIEF DESCRIPTION OF DRAWINGS

FIG. 6 is a schematic view depicting wave shapes and timing charts in the apparatus in operation according to the present invention.

FIG. 7 is a schematic view depicting wave shapes and timing charts in the apparatus in operation according to the present invention.

BEST MODES OF THE INVENTION

The present invention will be explained below, referring to the embodiments.

Figure 1:
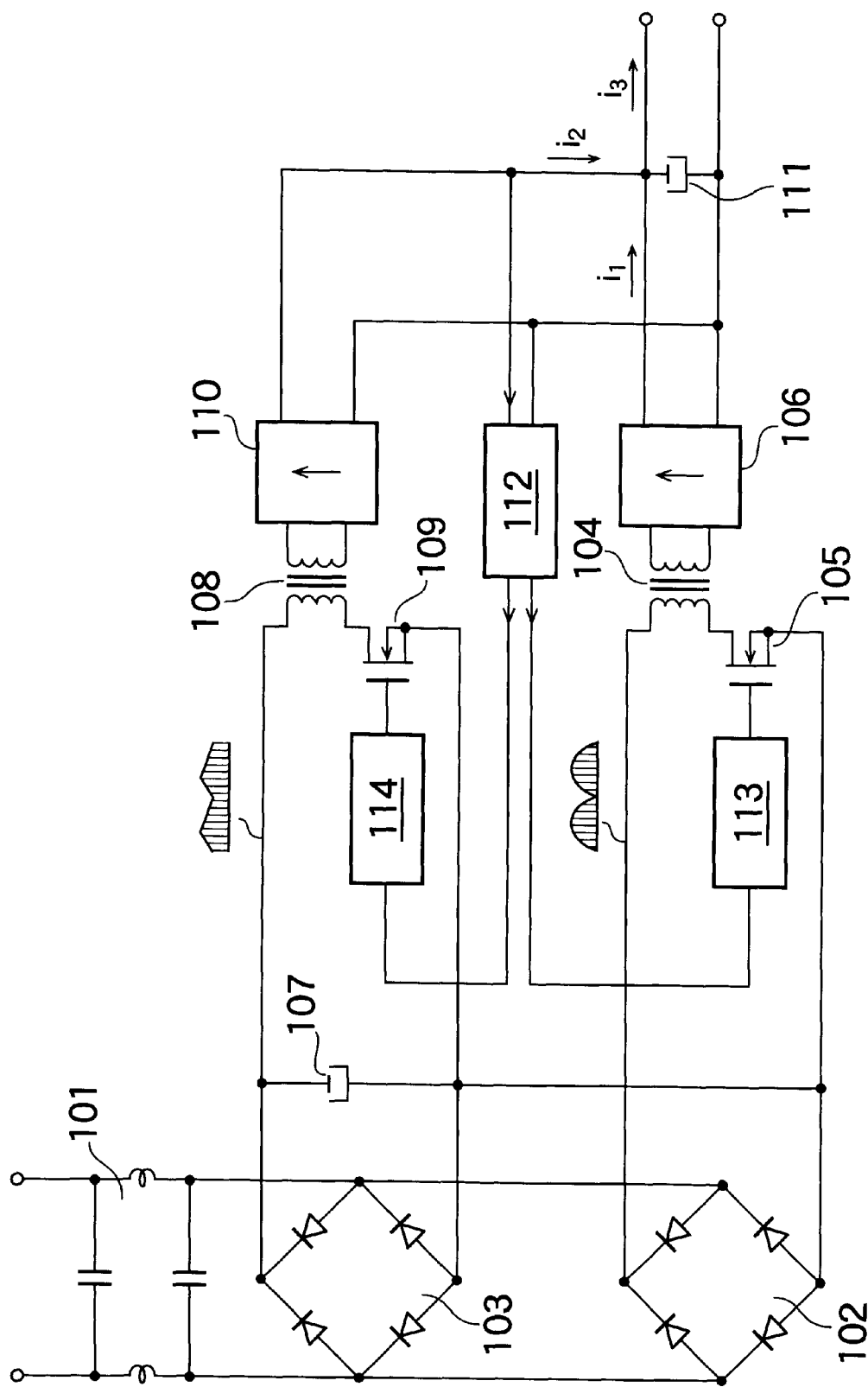
FIG. 1 is a circuit diagram showing an embodiment of the power supply apparatus according to the present invention, in which a basic construction of the present invention is shown.

In FIG. 1, an alternative current input passes through a filter 101, which is provided for preventing a high frequency and then is rectified by rectifier circuits 102 and 103. At the rectifier circuit 102 side, the output thereof becomes a rectified line current. The rectified line current is switched by a switching element 105 through a transformer 104 and then rectified at a rectifier circuit 106 on the secondary side of the transformer 104 to obtain an electric current i1. While, at the rectifier circuit 103 side, the output thereof is smoothed by a smoothing capacitor 107 to obtain a direct current; the direct current is switched by a switching element 109 through a second transformer 108, then rectified by a rectifier circuit 110 to obtain an electric current i2. The sum of the current i1 and i2 is charged in a capacitor 111 to produce an output current i3.

Then the voltage at both terminals of the capacitor 111 is distributed by a distributor 112 at a suitable ratio; and then supplied into a low speed servo circuit 113 and a high speed servo circuit 114, respectively, to form feedback loops.

The feedback loop on the switching element 105 side is conducted so slowly that a ripple cannot follow it; therefore, the ripple remains in the electric current i1. Such a slow servo operation, of course, is helpful to improve the power factor. On the other hand, a high speed feedback loop works at the switching element 109 side so that an instant value of the sum of the electric current i1+i2 becomes constant and then the ripple is removed, keeping the ratio of mean electric currents of i1 and i2 appropriately. The wave shapes of these currents i1, i2 and i3 are shown in FIGS. 6(a) to 6(c), respectively.

According to the circuit construction shown in FIG. 1, the electric current going through either of the rectified line current route and the direct current route is switched only once. Therefore, the efficiency of the power supply apparatus is improved in comparison to the two-stage converter type apparatus where a switching loss is caused twice. In addition to this, the size of the apparatus can be made far smaller than the two-stage converter type apparatus, because a sufficient power can be obtained form the added current of i1 and i2.

Figure 8A:
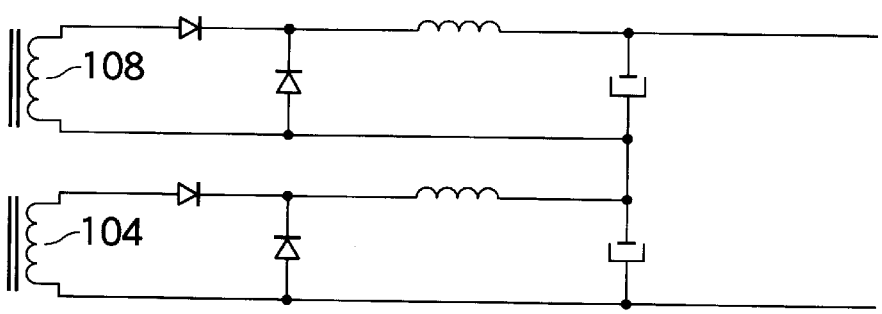
FIG. 8 is a circuit diagram illustrating a secondary side of the apparatus where outputs of converters are added in a serial manner.

In the above embodiment, the electric currents are added together, however, in case that both transformers 104 and 108 operate in a forward manner, it is preferred that the rectifier circuits at the secondary side are connected in a serial manner to obtain an added output voltage. FIG. 8(a) represents an example of the output section of the apparatus where the rectifier circuits at the secondary side are connected in a serial manner.

According to this embodiment, the wave shape of the input current becomes an added output (FIG. 6(f) sine wave at the rectified line current side (FIG. 6(e)) and the pulse-like wave shape (FIG. 6(d)) obtained by a capacitor input. Therefore, the power factor does not reach to that of the two-stage converter type apparatus; however, it is still in a range of regulation.

Figure 2:
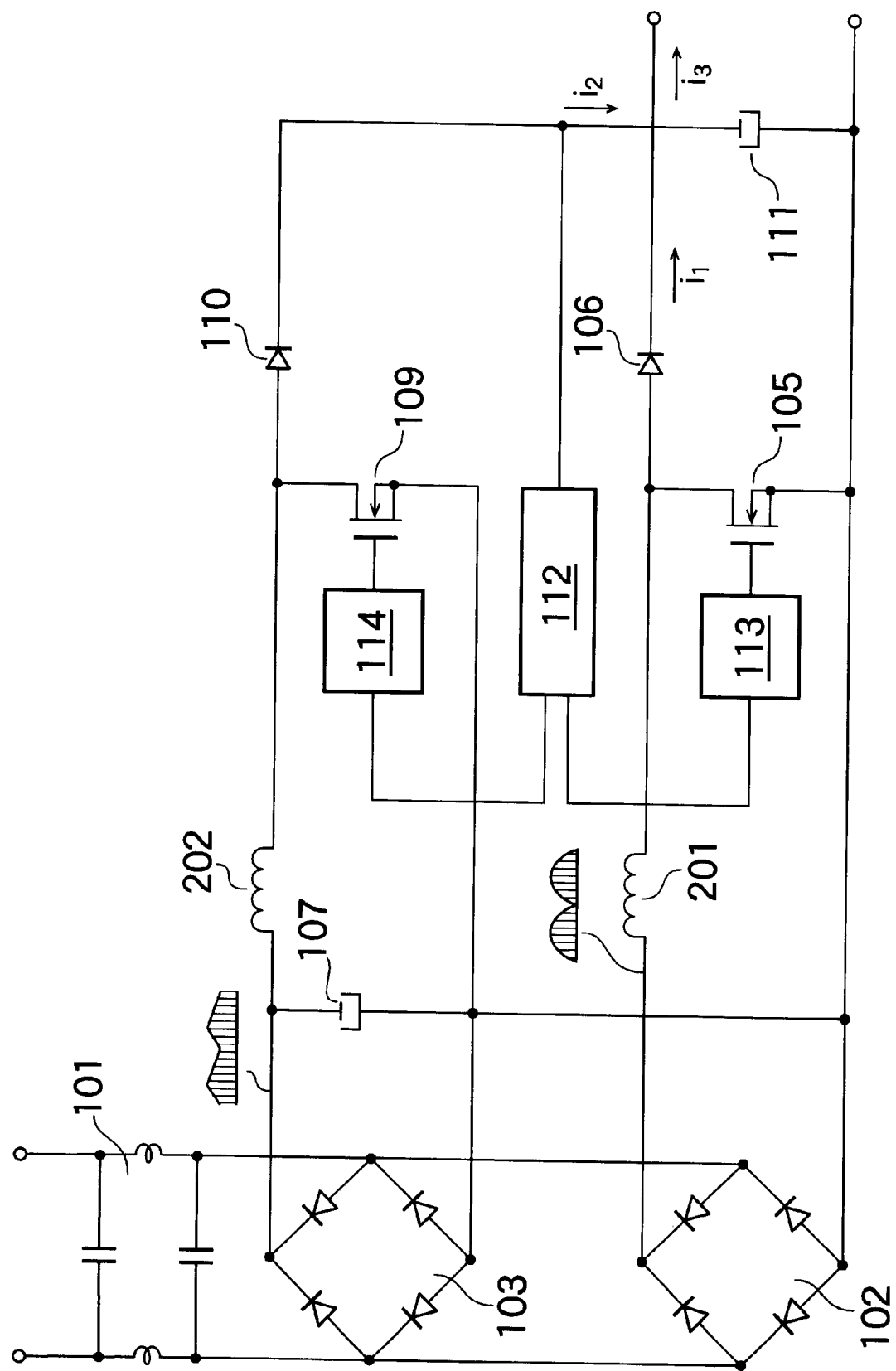
FIG. 2 is a circuit diagram depicting another embodiment of the power supply apparatus according to the present invention, in which the primary side and the secondary side are not isolated from each other.

In FIG. 2, another embodiment of the power supply apparatus according to the present invention is shown where no isolation is required. It should be noted that same numerical references are used for the common elements in the apparatus shown in FIG. 1 and the explanation therefore is omitted here. In this embodiment, inductors 201 and 202 are used for the first and second transformer 104 and 108. When a parallel operation of a rectified line current route is conducted, an issue to be considered is a balance of an amount of electric current. The other method than this embodiment may be used. That is to say, a controlling method may be used such that a mean electric current of one of the converters follows to that of the other. In this case, it is preferred that, a mean electric current of a converter for use in correcting the ripple, in which a high speed feedback operation is required, is used as a reference route; and the other converter, i.e. a converter on a main power supply side which produces ripples, follows to the reference converter with a low speed. Such an arrangement makes it easier to control the apparatus.

In case of the embodiment shown in FIG. 2, it may be possible to have a circuit construction where the switching elements 105 and 109 are substituted by one switching element and the rectifier circuits 106 and 110 are substituted by one rectifier circuit as well, in order to make the construction of the apparatus simpler. In such an arrangement, two different type converters are used in a parallel manner, and therefore, an expected effect can be obtained.

Figure 10A:
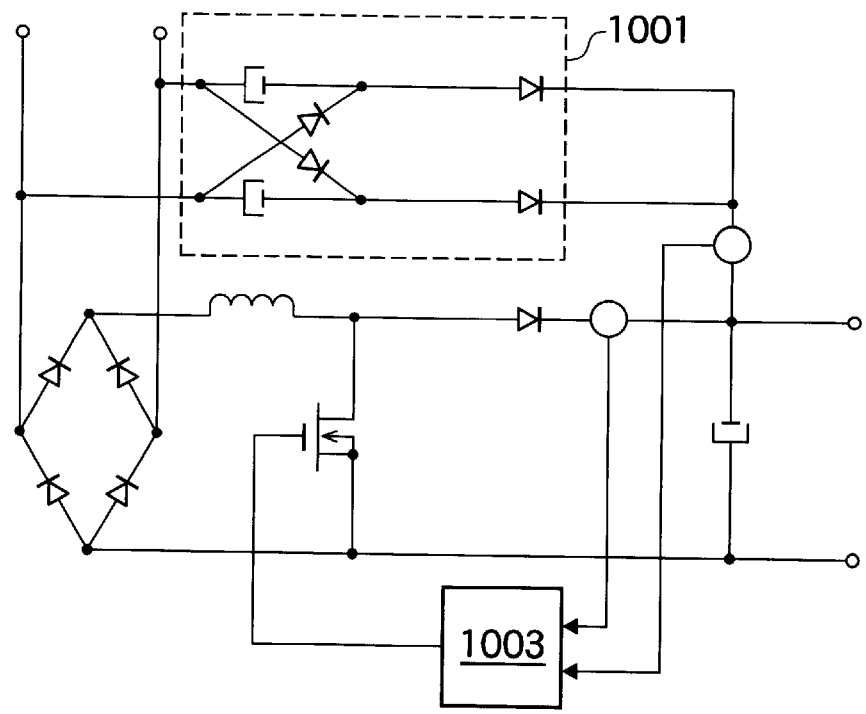
FIG. 10 is a circuit diagram showing a simplified modification of an output side of the direct current route of the embodiment shown in FIG. 2; a full wave voltage doubler rectification circuit is used in FIG. 10(a); and a full wave rectification circuit is used in FIG. 10(b).

In the embodiment shown in FIG. 2, switching operation is conducted in both the first and second routes. A modification thereof is mentioned in FIG. 10(a), where the direct current route is simplified in such a manner that the switching circuit is omitted, and a voltage doubler rectification circuit is provided therefor. It should be noted that the voltage doubler rectification circuit can be further simplified by substituting a half wave voltage doubler rectification circuit, as mentioned in FIG. 11(a) or FIG. 12(a).

Such an arrangement is suitably used for the case in that the required output voltage is 2 times the square root of 2, i.e. 2.82, of the alternating input voltage, and no line regulation is required. The important matter is that the full wave rectifier circuit, where an output voltage is the square root of 2, i.e. 1.41, of an alternating input voltage, has an inadequate operation range, when it is combined with a choke coil. Therefore, in case a rectifier circuit is used being combined with a choke coil or an auto-transformer, it is necessary to use a voltage multiplying rectifier circuit where the output voltage becomes double or higher in order to obtain optimum operation. It is possible that the choke coil can be substituted by an auto-transformer or a transformer in the case where it is used with a voltage doubler rectification circuit.

It should be noted that such a controlling method is taken in this case that the mean value of the electric current at the direct current side, which is obtained in the voltage doubler rectification circuit 1001, is detected by an electric current sensor 1003; then making the amount of the output current on the rectified line current side, where a switching circuit is provided, to follow it. However, if the load current is constant, such a controlling loop is unnecessary.

Further, the load is not particularly limited in this embodiment so that the apparatus can be applied to a power of any sort of electric equipment so far as it uses a DC motor.

The embodiments shown in FIG. 10(b), FIG. 11 and FIG. 12, which will be explained below, have an effect that an efficiency is increased and the electrical reactor of the circuits can be made compact and light by adding the circuits surrounded by the broken line, nevertheless the power factor is decreased in comparison to the apparatus where circuits surrounded by the broken line are not added. Therefore, in case that the apparatus has a margin for the standard of harmonics, such an arrangement can be applied efficiently.

It should be noted, that only the part surrounded by the broken line in these embodiments will be explained, and an explanation for the other part is omitted here.

Figure 10B:
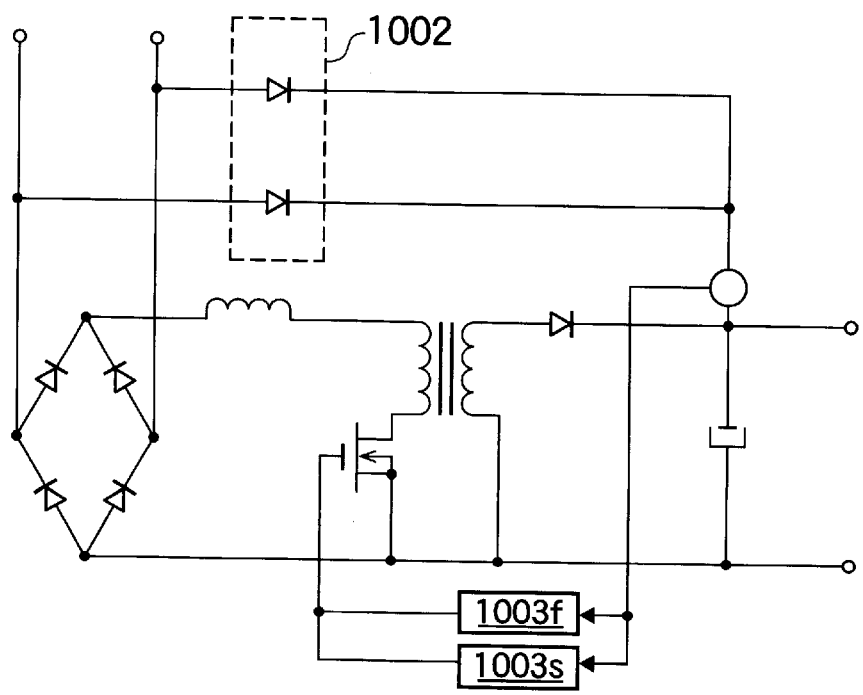
Figure 13:
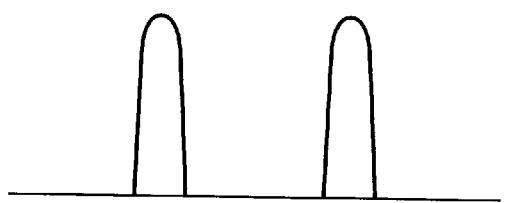
FIG. 13 is a schematic view illustrating wave shapes in the modifications shown in FIGS. 10, etc.
Figure 13:
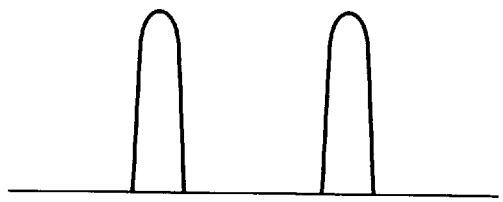
Figure 13:
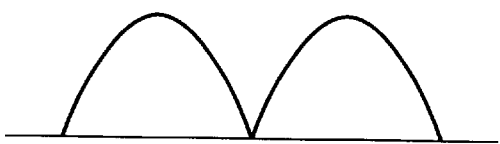
Figure 13:
Figure 13:
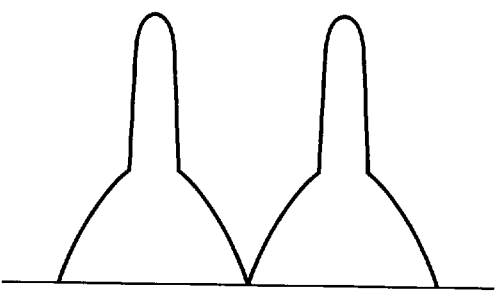
Figure 13:
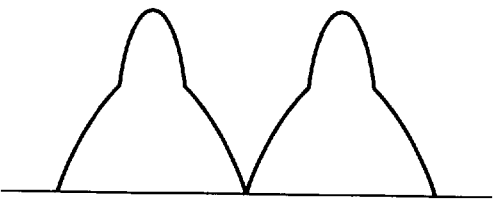

In the embodiment shown in FIG. 10(b), not the choke coil or the auto-transformer, but the transformer 1004 is combined with a full wave rectification circuit 1002. In this embodiment, the width of a switching pulse is so controlled in accordance with an output current of the full wave rectification circuit that the same effect for making a good balance of electric current as that in the circuit shown in FIG. 10(a) can be obtained. In the apparatus shown in FIG. 10(b), the control circuit 1003 comprises two parts, i.e. a high speed control circuit 1003f and a low speed control circuit 1003s. If no high speed control circuit 1003f is provided, the apparatus operates according to the waveforms illustrated in FIG. 13(a1)~(a3). Due to the existence of the high speed control circuit 1003f and due to the fact that the circuit 1003f modulate such that a duty cycle is decreased when the electric current in the direct current route (reverse direction) is great, the center portion of the waveform of the output is concave, as shown in FIG. 13(b2). As a result, the harmonics component of the added electric current is reduced. The contrivance shown in FIGS. 10(a) and 10(b) for making a balance in electric currents in both routes is one of the characteristics of the present invention.

Figure 11A:
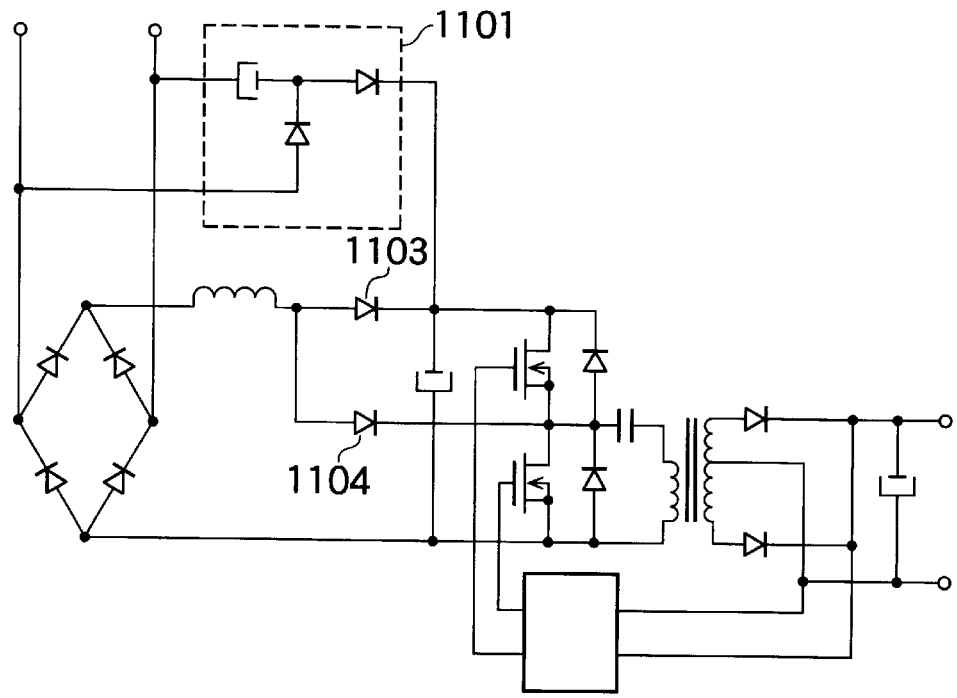
FIG. 11 is a circuit diagram depicting another modification where a half bridge type AC-DC converter is applied; a half wave voltage doubler rectification circuit is used in FIG. 11(a); and a full wave rectification circuit is used in FIG. 11(b).

In the apparatus shown in FIG. 11(a), the present invention is applied to a half bridge type switching power supply having a half wave voltage doubler rectification circuit 1101. The lower side diode 1104 can be substituted by a capacitor. Further, in case that FET(s) is/are used as a switching element(s) in the apparatus, both of the diodes can be omitted, because the FET(s) has/have a body diode and thus the lower side diode 1104 is short circuited and the upper side diode 1103 is open. This apparatus can be applied not only to the switching power supply but also to a power supply system for use in lighting equipment.

Figure 11B:
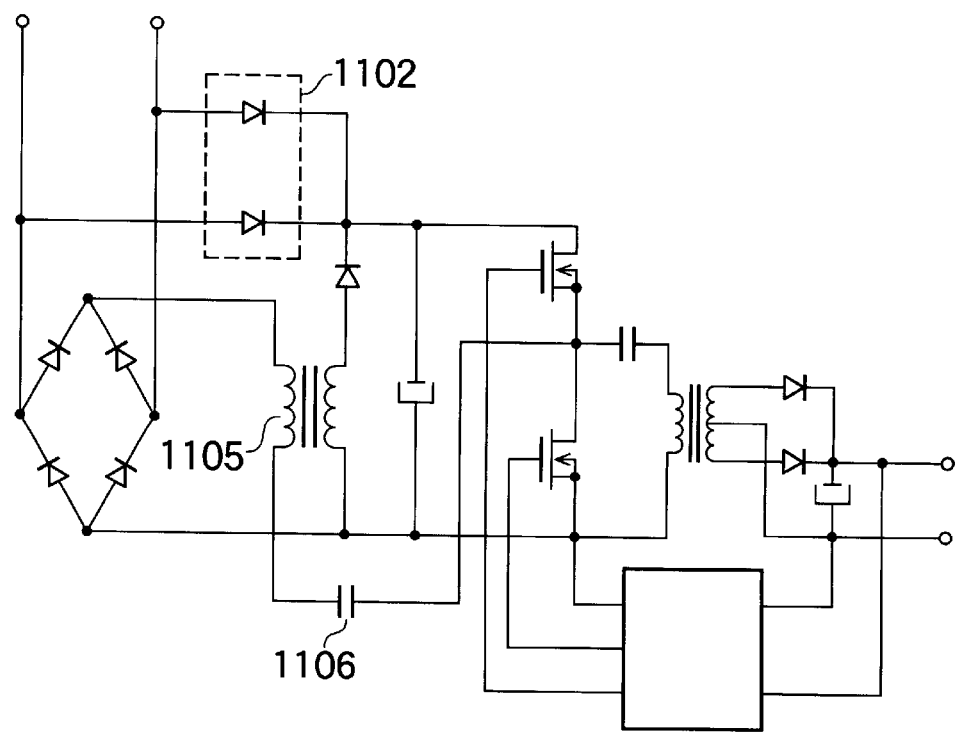

In the embodiment shown in FIG. 11(b), the present invention is applied to a half bridge type switching power supply having a rectifier circuit 1102. In this embodiment, transformer 1105 is used in order to make it possible to combine it with a full wave rectification circuit. The lower side capacitor 1106 can be substituted by a diode. This embodiment can also be applied not only to the switching power supply but also to a power supply system for use in lighting equipment.

Figure 12A:
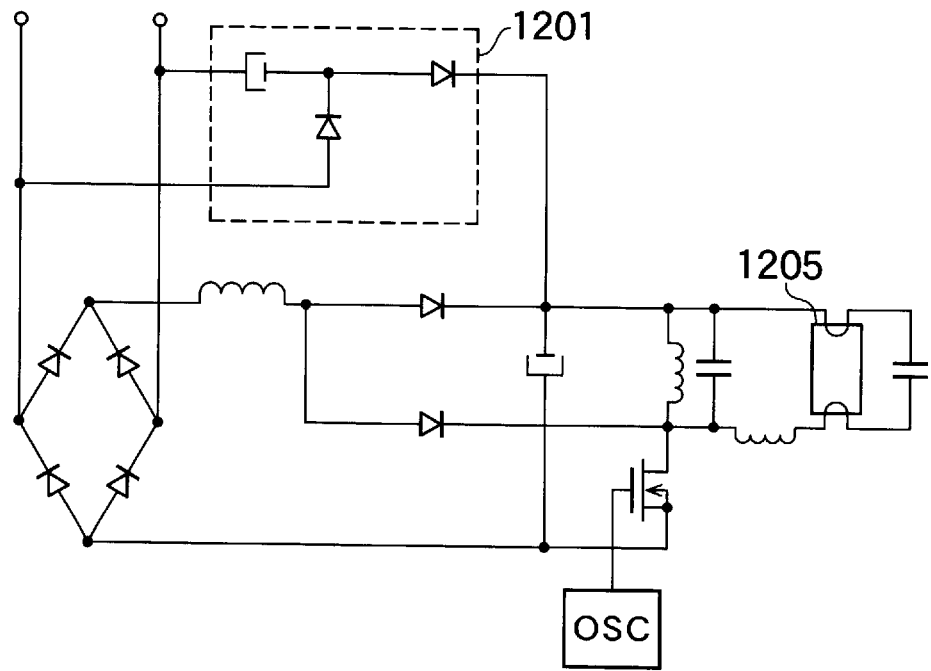
FIG. 12 is a circuit diagram illustrating another modification where the apparatus shown in FIG. 10 is applied to an lighting equipment; a half wave voltage doubler rectification circuit is used in FIG. 12(a); and a full wave rectification circuit is used in FIG. 12(b).

In the embodiment shown in FIG. 12(a), the present invention is applied to a power supply system for use in lighting equipment, where a half wave voltage doubler rectification circuit 1201 is used. A lower side diode 1204 can be substituted by a capacitor. The numerical reference 1205 represents a light tube of the lighting equipment. This embodiment can also be applied to the switching power supply.

Figure 12B:
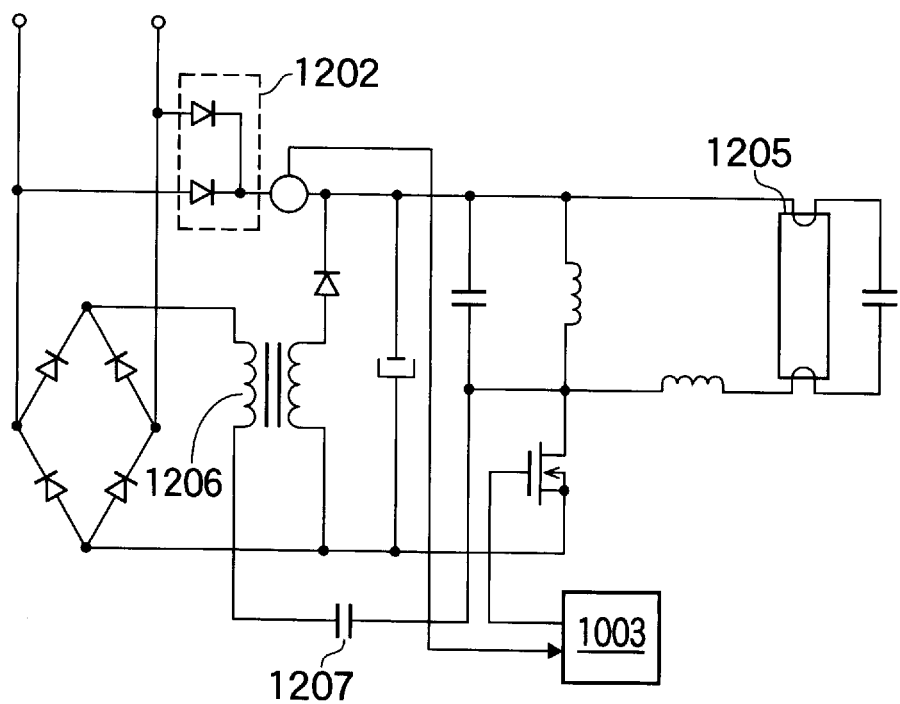

In the embodiment shown in FIG. 12(b), the present invention is applied in a power supply system for lighting equipment, where a transformer 1206 is used in order to suitably combine it with full wave rectification circuit 1202. In this case, a capacitor 1207 can be substituted by a diode. Further, this embodiment also be able to be applied to a switching power supply. The same as the embodiment shown in FIG. 10(b), an output current of the full wave rectification circuit 1202 is detected, and the detected output is used to make a concave form in the peak portion of the rectified line current. The output current may be detected with a voltage at both terminals of the circuit 1202 using a low resistor.

Figure 3:
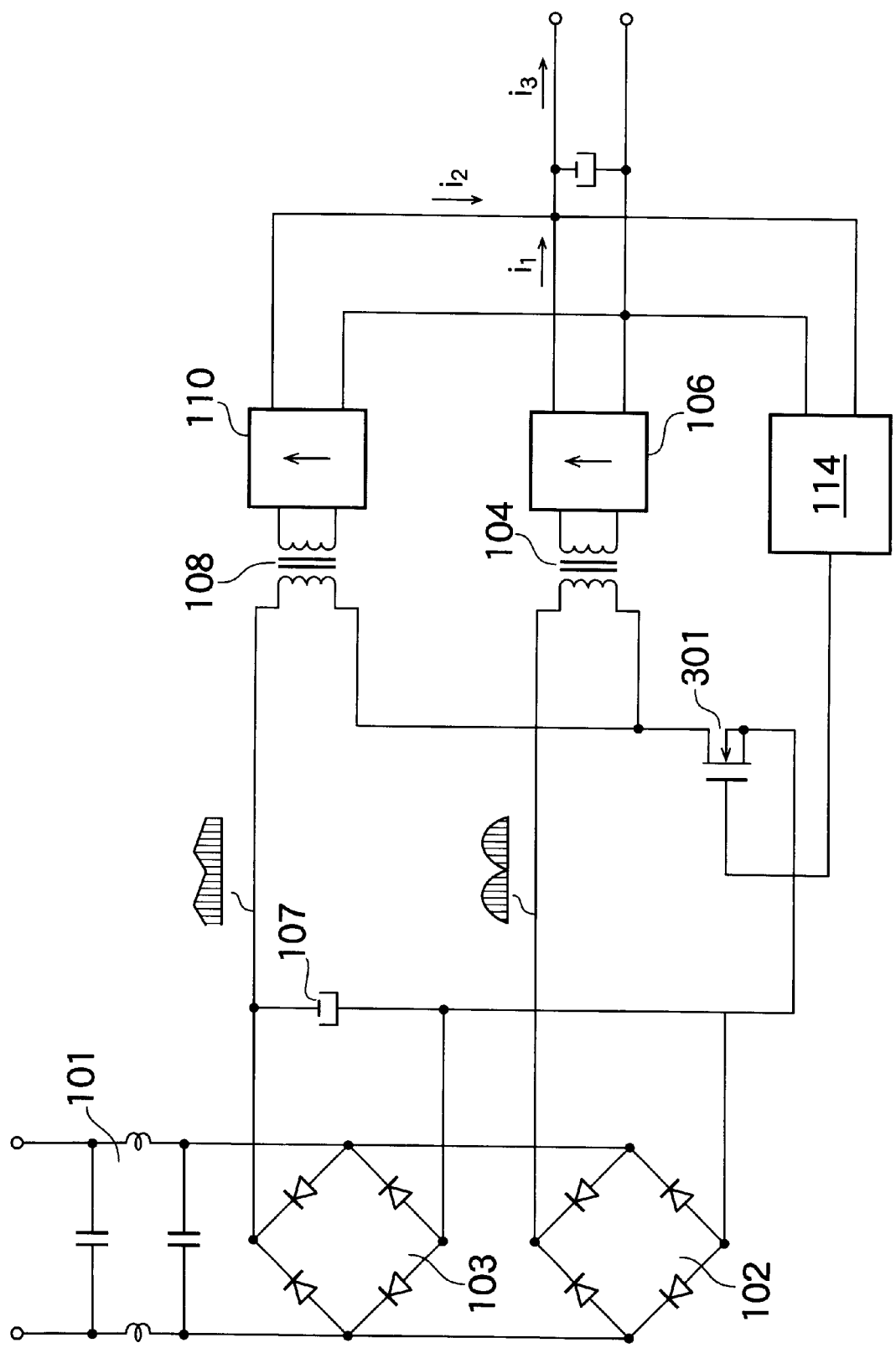
FIG. 3 is a circuit diagram illustrating still another embodiment of the power supply apparatus according to the present invention, in which only one switching element is provided.
Figure 8B:
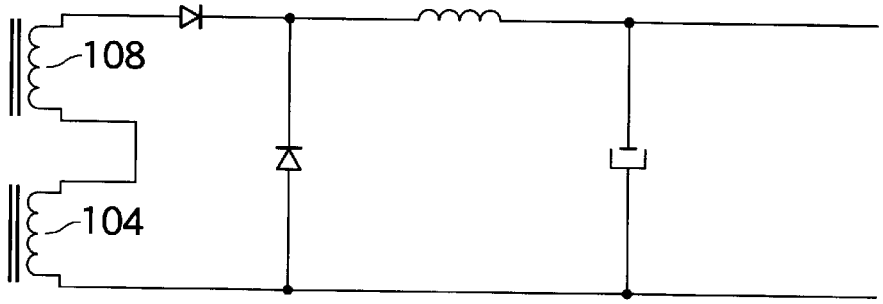

FIG. 3 illustrates another embodiment showing a single stage converter type power supply apparatus where a single switching element 301 is commonly used for both the rectified line current route and the direct current route, instead of the switching elements 105 and 109 in the apparatus shown in FIG. 2. The wave shape of an electric current i2 has an adverse ripple to that of the electric current i1 due to the ripple reducing function conducted in the feedback operation in the controlling circuit 114. Therefore, the apparatus works in the same manner as the apparatus shown in FIG. 1. Since either of the rectified line current component and the direct current component is outputted with only one switching operation, the efficiency is improved. In case that the secondary side works in a forward operating mode, it may be possible to arrange that the windings at the secondary side are connected in a serial manner as shown in FIG. 8(b).

Figure 4:
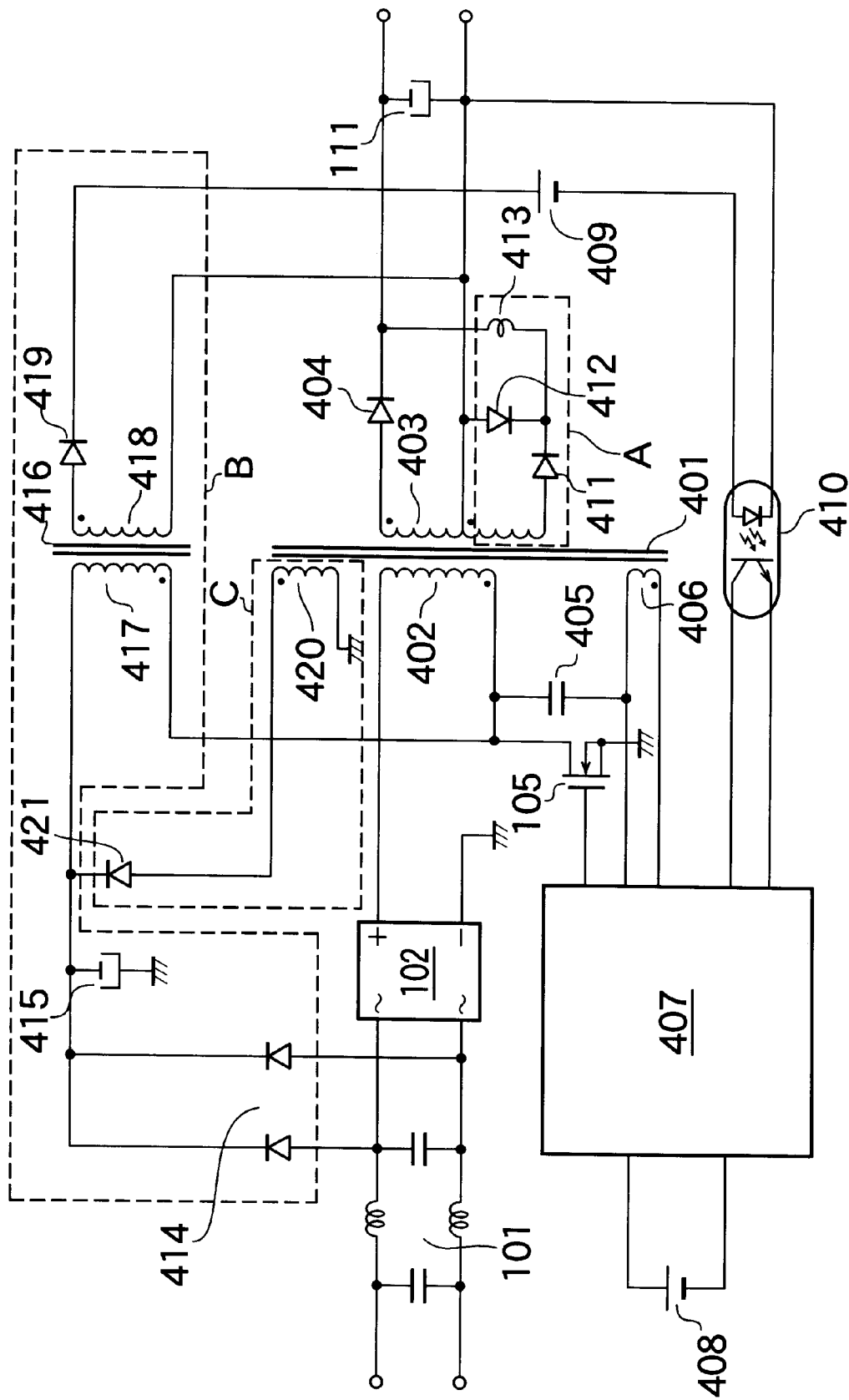
FIG. 4 is a circuit diagram representing still another embodiment of the power supply apparatus according to the present invention, in which only one switching element is provided.
Figure 5:
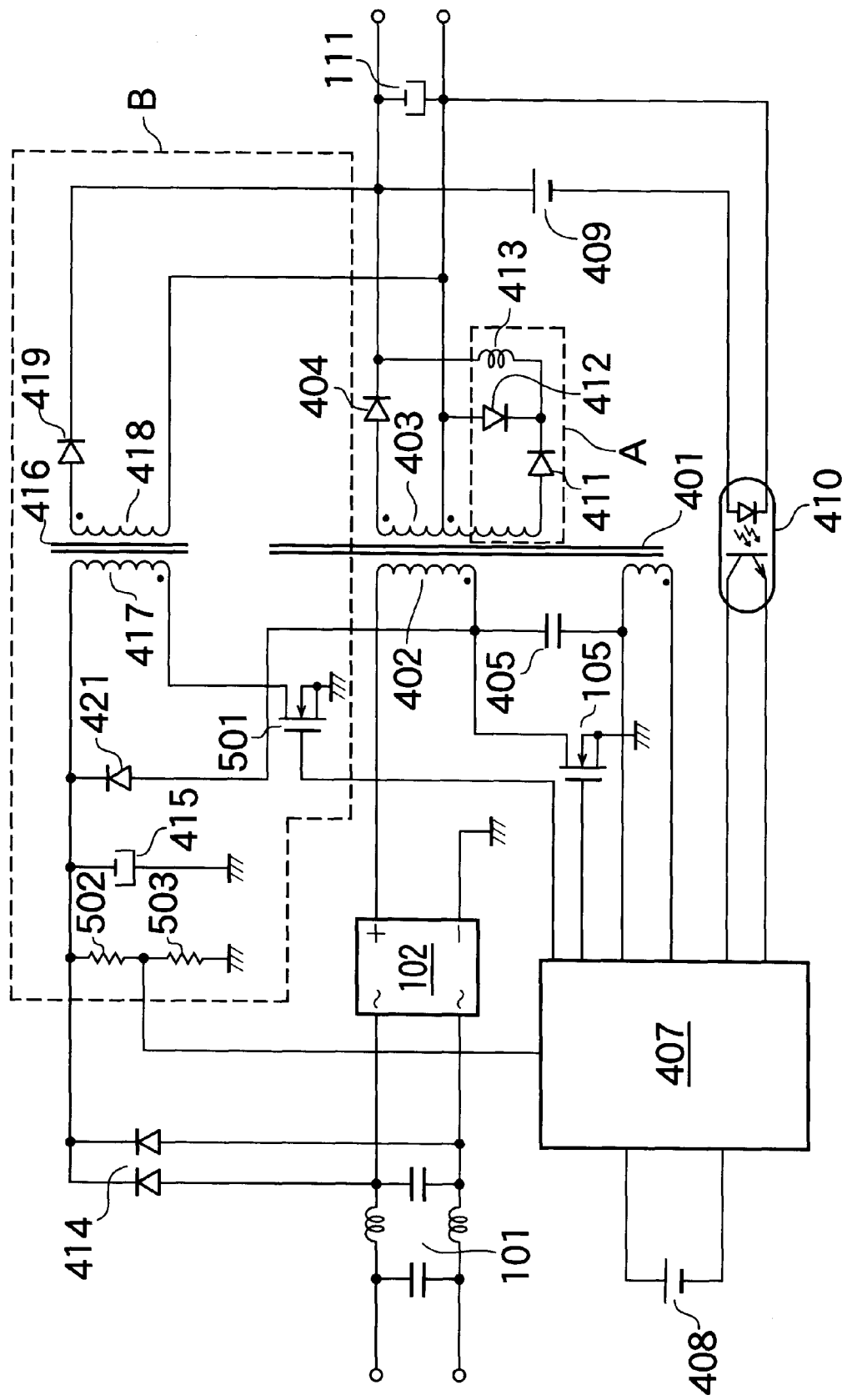
FIG. 5 is a circuit diagram showing still another embodiment of the power supply apparatus according to the present invention, in which two switching elements are provided.

FIGS. 4 and 5 are circuit diagrams depicting more concrete embodiments; the present invention will be explained in more detail, referring to these figures.

First, a circuit shown in FIG. 4, however, not providing Part A, Part B and Part C surrounded by broken lines, will be explained. The circuit without these Parts A, B and C shows a conventional converter, where an input current goes through a π-type filter 101, which is provided for preventing that high frequency components occur on the current of the commercial power supply line side, and a rectifier circuit 102; and the thus obtained rectified line current is supplied to a switching transformer 401. When the switching element 105 is switched on, the electric current goes through a winding 402 of a switching transformer 401. The energy thereof is stored in cores of the transformer 401. Then, when the switching element 105 is switched off, the energy stored in the cores is transferred to a capacitor 111 via a winding 403 and a diode 404. At the time when the transfer of the energy is finished and the electric current becomes zero, a resonation starts at the primary inductance of the winding 402 and a capacitor 405 provided for the resonation; and then a voltage between both the terminals of the capacitor 405, i.e. a voltage between both the terminals of the switching element 105, starts to be decreased.

This timing is detected by a winding 406 at the same time, and then a timing signal is sent to a control circuit 407. When a half (½) time of a resonating period passes, the voltage between both the terminals of the capacitor 405 changes from top to bottom and becomes minimum. At this timing, the control circuit 407 supplies the next ON signal to the switching element 105.

According to such an arrangement, it becomes possible to make the discharge current of the capacitor 405 for a resonation minimum, and therefore any energy loss caused by the discharge current can be reduced. The control circuit 407 includes a back up oscillator in order to prevent that the oscillation stops in case that no signal comes when the apparatus starts up or instant power failure occurs. It should be noted that the numerical reference 408 represents a power supply for operating the control circuit 407.

The voltage at both terminals of a capacitor 111 is transferred to the control circuit 407 through a reference voltage 409 and a photo coupler 410. By this signal, a feedback loop is formed for adjusting the on time of the switching element 105 to stabilize the voltage at both terminals of the capacitor 111. This is realized by combining a partial resonating technique, i.e. a sort of soft switching technique where only ½ period of signal is resonated, with a flyback type capacitance-less converter. The operation thereof corresponds to that obtained when electric currents passing through diodes 411 and 412 in the Part A are zero (the operation can be shown by wave shapes in FIG. 7, however, the wave shapes in FIG. 7(d) and (e) should be zero.)

The present invention is realized by adding the Part A, i.e. an output circuit of a forward type converter, into the conventional apparatus shown in FIG. 4, so that electric current going through the diode 411 and 412 is added. In this case, when the switching element 105 is on, an electric current is supplied to the diode 411 and then the current is charged in the capacitor 111 through an inductor 413. While, when the switching element 105 is off, an electric current is supplied to the diode 412 and the inductor 413, and then the current is added with the current going through a diode 404 to be charged in the capacitor 111. In a flyback type converter, when the switching element 105 is on, all energy is stored in the cores of the transformer. Contrary to this, according to this embodiment, since the energy to be stored in the transformer is reduced, a part for the electric current going through the diode 411. Therefore, it becomes possible to made the cores of the transformer smaller. In addition to this, according to this embodiment, a character of the forward type converter is mixed. Thus, the gap between the cores of the transformer 401 can be made narrower, so that an eddy current loss occurring at the gap is also reduced and efficiency can be improved. In this case, it is required to make a balance in the ratio of windings so as not to produce too much forward current.

According to such a construction, almost the same operation of electric current and voltage at the switching element as those in the flyback type converter can be obtained. In other words, the efficiency of the transformer is increased while keeping an ease for controlling the switching element; the power factor can be improved, and it becomes easier to combine the forward type converter with a resonating operation.

It should be noted that a problem of the holding time and the ripple is still left in this embodiment. However, in case that a main equipment to which the power supply apparatus should be used, has alternative solution therefor, the apparatus shown in FIG. 4 can be used without causing a problem.

Next, another embodiment, where a holding time is kept longer and a ripple is reduced, will be explained, referring to FIG. 4. A circuit diagram adding the Part B should be taken here.

An electric current supplied from a commercial AC supply is charged in a capacitor 415 via another rectifier circuit 414. The current charged in the capacitor 415 is supplied to a winding 417 of a second transformer 416 when the switching element 105 is on, so that the current is also stored in the cores of the second transformer 416. When the switching element 105 is off, the thus stored current is supplied to the capacitor 111 via a winding 418 and a diode 419. Due to the addition of the part B, a great amount of energy can be stored in the capacitor 415 and therefore the holding time for a power failure can be kept longer. Further, at the second transformer 416 side, not a rectified line current but a direct current is switched, so that a ripple can be reduced thereby. As a result, a necessary power factor can be maintained without decreasing the efficiency, while, a long holding time is available and the ripple can be made small.

Next, another embodiment, in which the part C is further added into the apparatus shown in FIG. 4, will be explained. In this embodiment, a winding 420 is added to the transformer 401; a flyback surge energy, which is generated when the switching element 105 is off, is taken out from a winding 420, which is added to the first transformer 401, and stored in a capacitor 415 via an added diode 421. This constitutes a Sunaba circuit having no energy loss; thus the flyback energy is reused without causing a waste. In case that the energy going through the transformer 416 is satisfied, it is possible to omit the rectifier circuit 414.

In this case, the flyback energy of the first transformer 401 is discharged through diodes 421 and 404.

In this embodiment, the apparatus operates in a current discontinued mode. That is to say, the switching element 105 is turned on after all energy is discharged from the first transformer 401, i.e. the main transformer. Therefore, it becomes easy to combine the apparatus with a power factor improving technique or a partial resonance technique.

It is also possible to modify the apparatus such that a forward type output circuit is added at the second transformer 416 side, or that the transformer 401 side is arranged as a flyback type. Such a combination of output circuit, or the adding of the output side in a parallel manner or in a serial manner can be adequately selected in accordance with the construction type of the output circuit. There is another possibility that a plurality secondary windings are provided in these transformers to realize multiple outputs.

In this manner, a power supply for rectified line current and another power supply for direct current are prepared and operated in a parallel manner, then a necessary power factor can be obtained while increasing the efficiency. It should be noted that the switching circuit in the Part B takes a capacitor-input type system; however, an inductor or a resonating circuit, where an inductor and a capacitor are arranged in a parallel manner, may be inserted before the capacitor 415. These are generally used in order to improve the power factor. In this case, there is an advantage in that only a small inductor is required in comparison to the case where the circuit at the direct current side is constituted only of a capacitor input type.

In FIG. 5, another concrete embodiment is shown. The differences between the apparatuses in FIGS. 4 and 5 are: when the flyback serge energy of the transformer 401 is reused, the energy is taken from a winding 402 and charged in the capacitor 415 via a diode 421, and another switching element 501 is provided for use only in a winding 417 of the second transformer 416. According to this construction, an adverse ripple is generated at the transformer 416 side for compensating the rectified line energy produced at the first transformer 401 side; and therefore, it is possible to make an added direct current having lower ripple.

It should be noted that the diode 414 may be omitted in case that the surge back energy at the first transformer 401 can supply the energy passing through the transformer 416. In this case, the diode 421 and the capacitor 415 can be regarded as a Sunaba circuit having no loss, therefore no waste occurs there.

In this embodiment, assuming the case that the rectifier circuit 414 is not provided, a voltage at the capacitor 415 is detected by divided resisters 502 and 503, a servo control is applied to the switching element 105 in order to stabilize the voltage; while, another servo control is applied to the switching element 501 in order to stabilize the voltage at the capacitor 111.

FIG. 6 shows wave shape of electric currents going through the apparatus of the embodiments according to the present invention. FIG. 6(a) shows a wave shape of the electric current i1, FIG. 6(b) a wave shape of the electric current i2, and FIG. 6(c) a wave shape of the electric current i3. The current i3 is a sum of i1 and i2 (i1+i2=i3). FIG. 7(a) is a wave shape showing a voltage at the switching element 105 in the embodiment shown in FIG. 4; FIG. 7(b) a wave shape of an electric current going through the switching element 105; FIG. 7(c) is a wave shape illustrating an electric current going through the diode 404 which works as a flyback converter; FIG. 7(d) a wave shape depicting an electric current going though the diode 411 which works as a forward converter; and FIG. 7(e) a wave shape illustrating an electric current going through the diode 412 which also works as a forward converter.

The servo system applied to the switching element 105 works in such a manner that a rectified line current is switched by giving a feedback through a large time constant so as not to follow the ripple, and it is preferred because the power factor is improved. It stands to reason that the quicker servo system applied to the switching element 501 side cancels the ripple more effectively.

Figure 9:
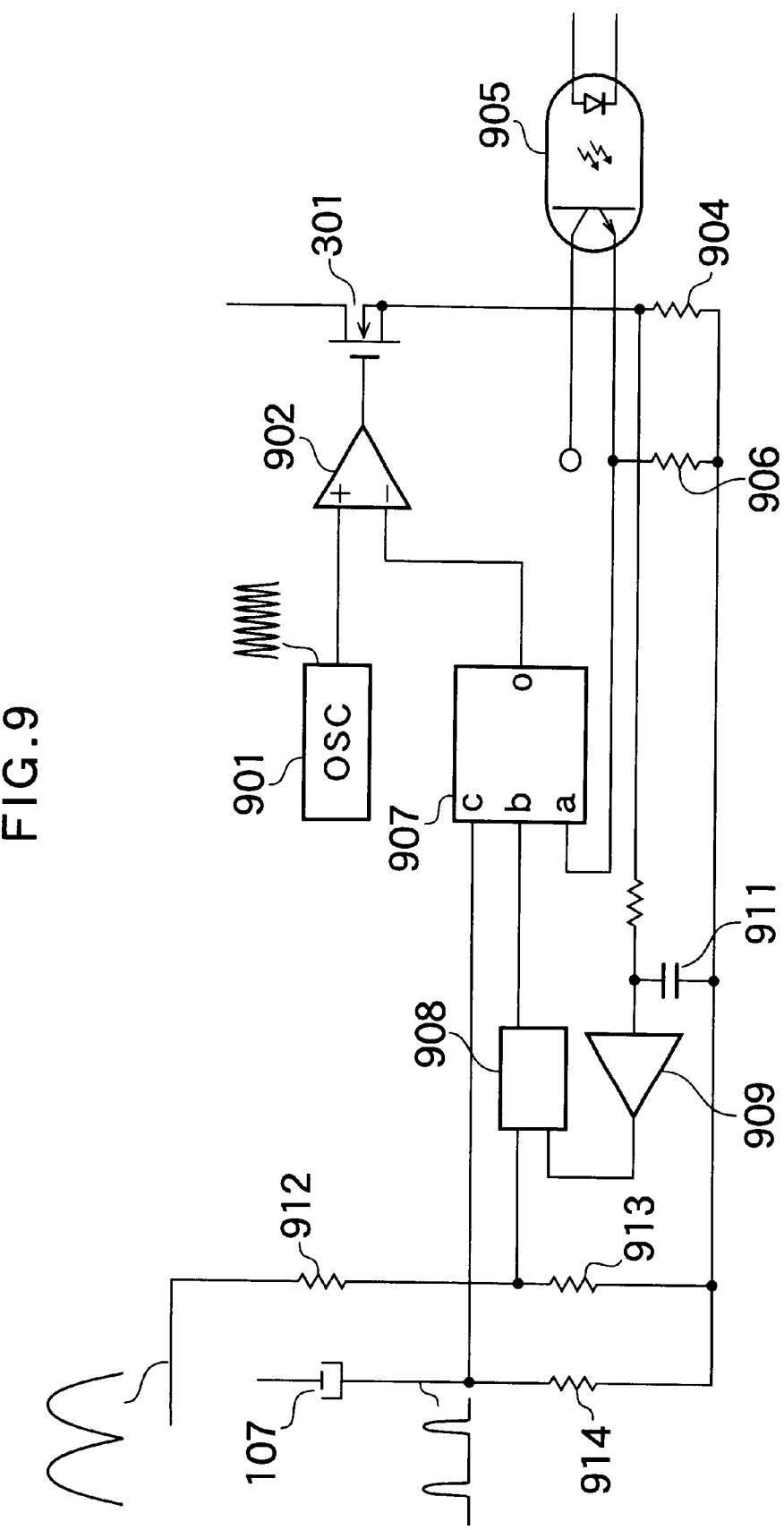
FIG. 9 is a circuit diagram representing a controlling section of an apparatus, which is so designed that the output ripple and the power factor thereof are improved.

In all of the embodiments stated above, a feedback system is used to reduce the ripple. However, in FIG. 9, another embodiment is shown where a higher technique for controlling the switching element is applied to the apparatus shown in FIG. 3. It should be noted that only the part for controlling the switching element is shown in FIG. 9. In this embodiment, a current, which is obtained by multiplying a rectified line current and a consumption current, is given to a control signal as a comparing signal for canceling a ripple; further a signal obtained by inserting a resistor for detecting an electric current to a smoothing capacitor in series is also given to the controlling signal in order to improve a power factor. A predictable factor, such as a ripple, is more correctly and easily controlled with a prediction in comparison to a feedback controlling, nevertheless the cost to manufacture the apparatus becomes higher than the apparatus where the feed back control is used. First, it should be assumed that the input terminals b and c do not exist in an adder 907. This is a general PWM, which is used in the embodiment shown in FIG. 3. A triangle wave outputted from an oscillator 901 is supplied to a plus terminal of a comparator 902; the minus terminal o of the comparator 902 is connector to an output terminal of the adder 907; a switching element 301 is driven by an output pulse of the comparator 902. When an output voltage at a secondary side of the transformer becomes high, a photo-coupler 905 becomes brighter to increase the potential at a resistor 906; then a potential at the minus terminal of the comparator 902 is increased via an adder 907. A servo-loop is formed in such a manner that the duty cycle of the switching element 301 is thereby decreased to make the output voltage on the secondary side small. An input rectified line voltage is divided by resistors 912 and 913 to be given to a multiplier 908. The other input signal of the multiplier 908 is obtained in such a manner that a consumption current component is taken out by means of a current detecting resistor 904; a direct current component thereof is further detected by a low pass filter composed of a resistor 910 and a capacitor 911; the thus detected current component is amplified by an amplifier 909. In the multiplier 908, both inputs signals are multiplied together. The product is given into the terminal b of the adder 907 to produce a signal for canceling ripple in accordance with the consumption current. In this embodiment, the consumption current is detected by means of the resistor 904; however, it is not limited to use the resister but the other means, for instance, a current transformer can be used.

The input signal at the terminal c of the adder 907 is added after an amount of current being charged in a smoothing capacitor 107 and its timing for the charge are detected by a resister 914, which is connected to the smoothing capacitor 107 in a serial manner. Therefore, during when the current is charged in the smoothing capacitor 107, the duty cycle is so decreased that the wave shape of the input current becomes smooth and thus the power factor is improved (see the wave shapes shown in FIG. 13(*b*1) to (*b*3)).

It may be possible to arrange such that the multiplier 908 and the amplifier 909 are omitted here and a constant rectified line current is added to the comparing signal so that ripple is canceled only when the rated power is outputted. In case the apparatus is constructed as a resonant type, the oscillator 901 and the comparator 902 can be substituted by a VCO. In this case, the same operation can be obtained.

In the conventional two-stage converter type power supply apparatus, almost the same amount of power is dealt with in the active harmonics filter part and in the DC-DC converter part. However, according to the present invention, the active harmonics filter part deals with a smaller amount of power than that of the conventional apparatus, and the DC-DC converter part deals only with a power for correcting the ripple. Therefore, the amount of power which should be dealt with in the DC-DC converter part becomes less than half of that of the active harmonics filter part. In this manner, according to the invention, since an output is taken out in a added manner, the efficiency is improved, the size of the apparatus can be made compact and then the cost for manufacturing the apparatus can be reduced. According to the system of the invention, the power factor and the removal of harmonics component are not beyond the conventional apparatus, however, they sufficiently satisfy the standard.

It should be noted that a parallel operation of different type power supply systems has not been used hitherto because such a construction causes a psychological effect as if a short circuit occurs when voltages in the power supply systems are different from each other. However, in case of switching power supply apparatuses, diodes are used as an elemental requirement; therefore there is no worry about such a short circuit. Concerning the output sections, which are connected in series to be added together, there is no worry either.

INDUSTRIAL APPLICABLE FIELD

According to the invention, the efficiency of the power supply apparatus can be increased, while keeping the holding time, the ripple performance, and a required power factor, high; and the apparatus can be made compact and the cost for manufacturing is able to be reduced. Further, since both a flyback type output circuit and a forward type output circuit are provided and these output circuits are connected in a parallel manner, the ease of controlling can be kept while improving the efficiency of the transformer. Therefore, the power supply apparatus can be easily combined with a capacitance-less converter or a partial resonance technique, and high efficiency can be obtained without generating heat but with a high reliability.

What is claimed is:

1. An AC-DC converter for converting single phase AC from a source of single phase AC power to DC, the converter comprising:

an input for connection to a source of single phase AC and an output for connection to a load;

a first circuit for converting single phase AC into DC, the first circuit including a first transformer with primary and secondary windings, a first rectifier coupled to said input and to a primary winding of the transformer for supplying rectified AC to the primary winding, and a second rectifier coupled to a secondary winding of the transformer for providing a rectified current;

a second circuit for converting single phase AC into a smoothed DC, the second circuit including a second transformer with a primary winding coupled to said input and a secondary winding, a capacitor intermediate said input and the primary winding of the second transformer for smoothing the current and a third rectifier coupled to a secondary winding of the second transformer for providing a rectified current;

a combining circuit coupled to the second rectifier and to the third rectifier and to said output to provide a combined current which is a combination of the second rectifier current and the third rectifier current;

switching means coupled to the primary windings of the first and second transformers for providing a current at the secondary winding of the first transformer which has a predetermined wave shape and for providing a current at the secondary winding of the second transformer which has a wave shape different from said predetermined wave shape; and control means coupled to at least said output and to said switching means to provide second and third rectifier currents which, when combined, provide a combined current which is DC of a substantially constant value with a predetermined load coupled to said output.

2. An AC-DC converter according to claim 1 wherein the primary winding of the second transformer is coupled to the input by a fourth rectifier.

3. An AC-DC converter according to claim 2 wherein the switching means comprises a switch coupled to both the primary winding of the first transformer and the primary winding of the second transformer.

4. An AC-DC converter according to claim 2 wherein the switching means comprises a first switch coupled to the primary winding of the first transformer and a second switch coupled to the primary winding of the second transformer.

5. An AC-DC converter according to claim 1 wherein the switching means comprises a first switch coupled to the primary winding of the first transformer and a second switch coupled to the primary winding of the second transformer.

6. An AC-DC converter for converting single phase AC from a source of single phase AC power to DC, the converter comprising:
   an input for connection to a source of single phase AC and an output for connection to a load;
   a first circuit for converting single phase AC into DC, the first circuit including a first transformer with primary and secondary windings, a first rectifier coupled to said input and to a primary winding of the transformer for supplying rectified AC to the primary winding, and a second rectifier coupled to a secondary winding of the transformer for providing a rectified current;
   a second circuit for converting single phase AC into a smoothed DC, the second circuit including a second transformer with primary and secondary windings, a third rectifier coupling a primary winding of the second transformer to said input, a capacitor intermediate said third rectifier and the primary winding of the second transformer for smoothing the current and a fourth rectifier coupled to a secondary winding of the second transformer for providing a rectified current;
   a combining circuit coupled to the second rectifier and to the fourth rectifier and to said output to provide a combined current which is a combination of the second rectifier current and the fourth rectifier current;
   a first switch in series with the primary winding of the first transformer for providing a current at the secondary winding of the first transformer which has a predetermined wave shape and a second switch means in series with the primary winding of the second transformer for providing a current at the secondary winding of the second transformer which has a wave shape different from said predetermined wave shape; and
   control means coupled to said output and to said first switch and said second switch to provide second and fourth rectifier currents which, when combined, provide a combined current which is DC of a substantially constant value with a predetermined load coupled to said output.

7. An AC-DC converter according to claim 6 wherein the combining circuit comprises a capacitor electrically in parallel with the output and the second and fourth rectifiers are connected electrically in parallel with the capacitor.

8. An AC-DC converter for converting single phase AC from a source of single phase AC power to DC, the converter comprising:
   an input for connection to a source of single phase AC and an output for connection to a load;
   a first circuit for converting single phase AC into DC, the first circuit including a first transformer with at least two primary windings and a secondary winding, a first rectifier coupled to said input and to one of the primary windings of the transformer for supplying rectified AC to the primary winding, and a second rectifier coupled to a secondary winding of the transformer for providing a rectified current;
   a second circuit for converting single phase AC into a smoothed DC, the second circuit including a second transformer with primary winding coupled to said input and a secondary winding, a capacitor intermediate said input and the primary winding of the second transformer for smoothing the current and a third rectifier coupled to a secondary winding of the second transformer for providing a rectified current;
   the other of the primary windings of the first transformer being coupled to the primary winding of the second transformer;
   a combining circuit coupled to the second rectifier and to the third rectifier and to said output to provide a combined current which is a combination of the second rectifier current and the third rectifier current;
   switching means electrically in series with said one of the primary windings of the first transformer and electrically in series with the primary winding of the second transformer for providing a current at the secondary winding of the first transformer which has a predetermined wave shape and for providing a current at the secondary winding of the second transformer which has a wave shape different from said predetermined wave shape; and
   control means coupled to said output, to said first transformer and to said switching means to provide second and third rectifier currents which, when combined, provide a combined current which is DC of a substantially constant value with a predetermined load coupled to said output.

9. An AC-DC converter according to claim 8 wherein the primary winding of the second transformer is coupled to the input by a fourth rectifier.

10. An AC-DC converter according to claim 9 wherein the switching means comprises a switch electrically in series with said one of the primary windings of the first transformer and electrically in series with the primary winding of the second transformer.

11. An AC-DC converter for converting single phase AC from a source of single phase AC power to DC, the converter comprising:
   an input for connection to a source of single phase AC and an output for connection to a load;
   a first circuit for converting single phase AC into DC, the first circuit including a first transformer with primary and secondary windings, a first rectifier coupled to said input and to a primary winding of the transformer for supplying rectified AC to the primary winding, and a second rectifier coupled to a secondary winding of the transformer for providing a rectified current;
   a second circuit for converting single phase AC into a smoothed DC, the second circuit including a second transformer with a primary winding coupled to said input and a secondary winding, a capacitor intermediate said input and the primary winding of the second transformer for smoothing the current and a third rectifier coupled to a secondary winding of the second transformer for providing a rectified circuit;

the primary winding of the first transformer being coupled to the primary winding of the second transformer;

a combining circuit coupled to the second rectifier and to the third rectifier and to said output to provide a combined current which is a combination of the second rectifier current and the third rectifier current;

a first switch electrically in series with the primary winding of the first transformer and a second switch electrically in series with the primary winding of the second transformer for respectively providing a current at the secondary winding of the first transformer which has a predetermined wave shape and for providing a current at the secondary winding of the second transformer which has a wave shape different from said predetermined wave shape; and control means coupled to at least said output and to each of said first switch and said second switch to provide second and third rectifier currents which, when combined, provide a combined current which is DC of a substantially constant value with a predetermined load coupled to said output.

12. An AC-DC converter according to claim 11 wherein the primary winding of the second transformer is coupled to the input by a fourth rectifier.

13. An AC-DC converter according to claim 11 wherein the first transformer has a further primary winding coupled to the control means and to the primary winding of the second transformer and wherein the control means is also coupled to the further primary winding of the first transformer.

* * * * *